Jan. 16, 1923.
P. E. HOLT.
TRACK LINK.
FILED APR. 30, 1919.
1,442,567
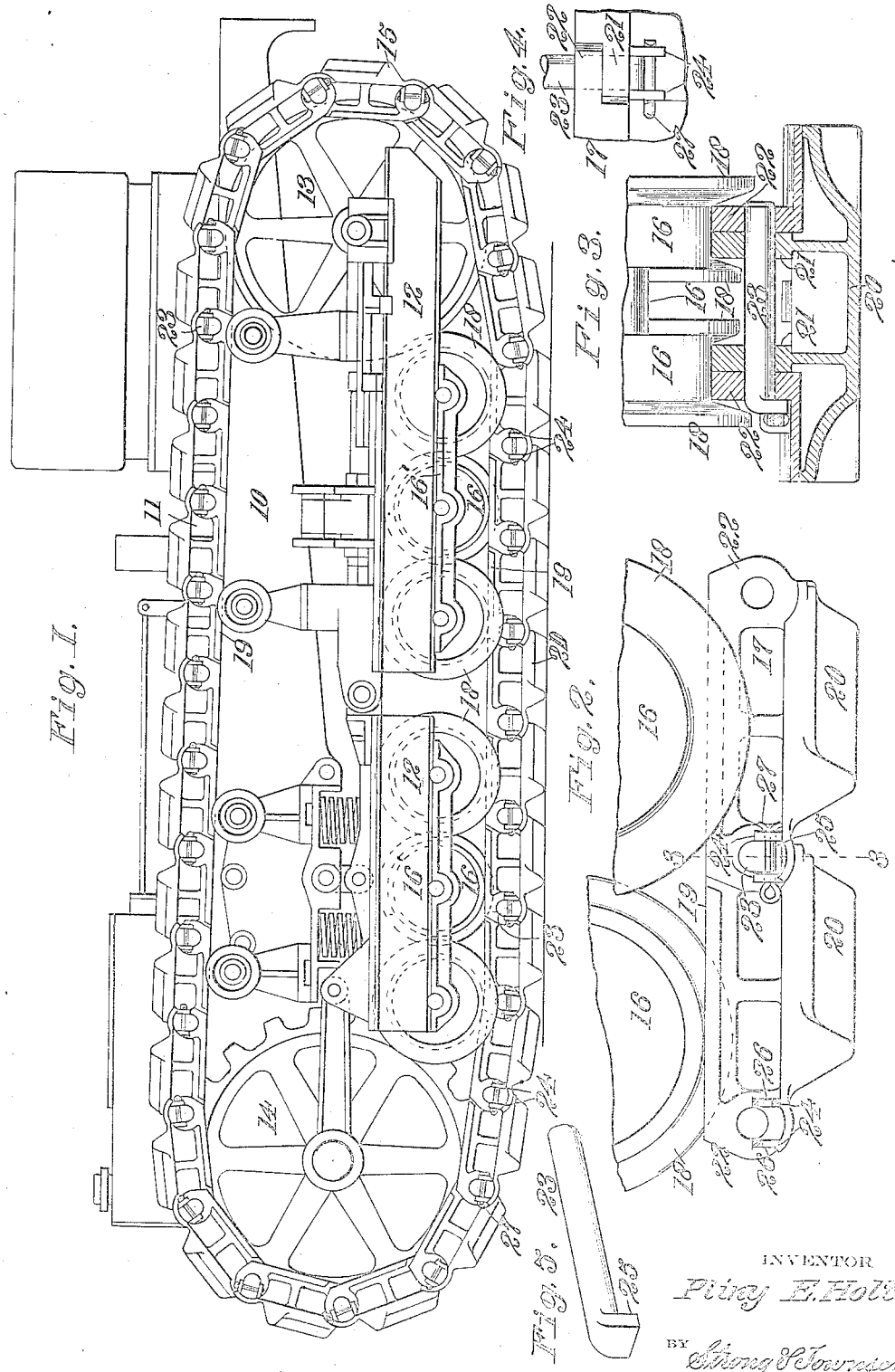
INVENTOR
Pliny E. Holt
BY
Strong & Townsend
ATTORNEYS Patented Jan. 16, 1923.

1,442,567

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRACK LINK.

Application filed April 30, 1919. Serial No. 293,620.

*To all whom it may concern:*

Be it known that I, PLINY E. HOLT, a citizen of the United States, residing at Stockton, in the county of San Joaquin and State of California, have invented new and useful Improvement in Track Links, of which the following is a specification.

This invention relates to a chain track tractor and particularly pertains to a link for the track thereof.

It is the principal object of the present invention to provide a track link for chain track tractors which is so designed as to accommodate load supporting rollers having large flanges. At the present time, it is the common practice to hinge the links together by means of pins which usually are formed with large heads which make it impossible for the load supporting rollers to have flanges which will satisfactorily prevent side motion of the rollers upon the lower run of the chain track. In the present instance, the track links are so constructed that special hinge pins may be used which will not limit the sizes of the roller flanges and will be held in position by a simple and inexpensive means.

The present invention contemplates the use of track links which have overlapping end portions, each formed with a pin opening adapted to register and to receive a hinge pin of special construction. These pins are formed with a head on one end which extends downwardly between lugs upon the links. This head is engaged by cotter pins secured detachably to the lugs and holding the pin against endwise movement.

The invention is illustrated, by way of example, in the accompanying drawings in which:

Fig. 1 is a view in side elevation illustrating a complete tractor of the self-laying track type and equipped with the track with which the present invention is concerned.

Fig. 2 is a view in side elevation disclosing fragmentary portions of the load-supporting rollers and the track links upon which they rest.

Fig. 3 is a view in vertical section and elevation on the line 3—3 of Fig. 2, clearly disclosing the mounting of the links and its relation to the flanges of the load-supporting rollers.

Fig. 4 is a fragmentary view in plan showing the manner in which the link is held in position between its lugs and by cotter pins.

Fig. 5 is a view in perspective illustrating one of the track pins.

Referring to the drawings, 10 indicates a tractor frame here shown as fitted with opposite chain track units 11. Each unit comprises a truck frame 12, an idler wheel 13, a driving sprocket wheel 14, and an articulate track 15 which is carried by the idler wheel and the driving sprocket wheel, and surrounds the truck frame. The truck frame 12 is fitted with a plurality of load-supporting rollers 16. These rollers are carried by bearings 16' secured to the under faces of the truck frame members and are intended to rest upon the lower run of the chain track. It is customary to form these rollers with flanges upon their sides which overhang the sides of track link 17. These flanges are clearly indicated at 18 in Fig. 3, and are shown to be disposed at opposite sides of the track link.

The track links may be of any desired construction and are preferably formed with parallel rail portions 19 which rest upon shoes 20. The rail portions, as indicated in Fig. 4, have flanged and cut-away portions to form the lugs 21 and 22 which overlap each other and through which the hinge pins 23 extend. The bodies of the track links are formed in the present instance with spaced lugs 24 which stand at equal distances upon the opposite sides of the central axis of the pins 23 and between which a downwardly extending head member 25 of the pins seats. The lugs 24 are each formed with openings 26 through which cotter pins 27 are positioned and which are so disposed as to bear against the ends of the heads 25 and hold the link pins 23 against the longitudinal movement.

The links are assembled with their end portions in overlapping relation as shown in Fig. 4, and thereafter the link pins 23 are inserted through the registering openings of the rails, so that the head portions 25 seat between the lugs 24 of each link.

When this has been done the cotter pins 27 are passed through the openings 26 in the lugs 24 and will act to hold the pins in position. It will be observed, by referring to Fig. 3 that the head portions 25 of the pins extend downwardly and thus provide clearance at the upper sides of the pins for the overhanging flanges 18 of the load-supporting rollers, thus permitting rollers with enlarged flanges to be used whereby to minimize the danger of the rollers getting off the track.

Having thus disclosed my invention it will be understood that various changes in the combination, arrangement and construction of parts may be made by those skilled in the art without departing from the spirit of the invention.

Having thus described my invention what I claim and desire to secure by Letters Patent is:

1. An endless flexible track comprising a series of articulated link sections, each having spaced side bars formed with rails at their inner longitudinal edges and carrying a shoe at their outer longitudinal edges, the ends of side bars of adjacent links being overlapped and provided with openings to receive a link pin, a pair of spaced lugs formed on the outside of the outer side bar at opposite sides of the opening therein, a link pin adapted to be inserted through the registered openings in the overlapping ends of the side bars, said pin having a head to fit between said lugs for the purpose of preventing rotation of the pin and limiting its inward movement and a key extending through openings in the lugs and spanning the head of the link pin to prevent outward movement of the latter.

2. An endless flexible track comprising a series of articulated link sections, each comprising spaced side bars formed with rails at their inner longitudinal edges and carrying a shoe at their outer longitudinal edges, the ends of the side bars of adjacent links being overlapped and provided with openings to receive a link pin, a pair of spaced lugs formed on the outside of the outer side bar at opposite sides of the opening therein, a link pin adapted to be inserted through the registered openings in the overlapping ends of the side bars, said pin having a head at one end to fit between said lugs for the purpose of limiting the inward movement of the pin and preventing rotation thereof, and means in connection with said lugs to prevent outward movement of the pin.

In testimony whereof I have hereunto set my hand in the presence of two subscribing witnesses.

PLINY E. HOLT.

Witnesses:
R. E. MANN,
P. EHRENFER.